United States Patent
Lee et al.

(10) Patent No.: US 9,355,641 B2
(45) Date of Patent: May 31, 2016

(54) MONITORING DEVICE USING SELECTIVE ATTENTION MODEL AND METHOD FOR MONITORING SAME

(71) Applicants: KYUNGPOOK NATIONAL UNIVERSITY INDUSTRY-ACADEMIC COOPERATION FOUNDATION, Daegu (KR); INDUSTRY-UNIVERSITY COOPERATION FOUNDATION SOGANG UNIVERSITY, Seoul (KR)

(72) Inventors: Minho Lee, Daegu (KR); Young-Min Jang, Gyeongsangbuk-do (KR); Sungmoon Jeong, Daegu (KR); Bumhwi Kim, Gyeongsangbuk-do (KR); Hyung-Min Park, Seoul (KR); Minook Kim, Gyeonggi-do (KR)

(73) Assignees: KYUNGPOOK NATIONAL UNIVERSITY INDUSTRY-ACADEMIC COOPERATION, Daegu (KR); INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 42 days.

(21) Appl. No.: 14/363,170
(22) PCT Filed: Dec. 5, 2012
(86) PCT No.: PCT/KR2012/010480
§ 371 (c)(1),
(2) Date: Jun. 5, 2014
(87) PCT Pub. No.: WO2013/085278
PCT Pub. Date: Jun. 13, 2013

(65) Prior Publication Data
US 2014/0334682 A1 Nov. 13, 2014

(30) Foreign Application Priority Data
Dec. 6, 2011 (KR) .................. 10-2011-0129935
Mar. 26, 2012 (KR) .................. 10-2012-0030718

(51) Int. Cl.
*G06K 9/00* (2006.01)
*G10L 17/02* (2013.01)
(Continued)

(52) U.S. Cl.
CPC .............. *G10L 17/02* (2013.01); *G06K 9/4628* (2013.01); *G10L 15/25* (2013.01); *H04N 7/18* (2013.01); *G06K 9/00221* (2013.01); *G06K 9/4671* (2013.01)

(58) Field of Classification Search
CPC ............ G06K 9/4671; G06K 9/00711; G06K 9/00624; G06K 9/00765; G06K 9/00335; G06K 9/3241; G06K 9/46; G06T 7/2093
See application file for complete search history.

(56) References Cited

U.S. PATENT DOCUMENTS 8,396,249 B1 * 3/2013 Khosla ................ G06K 9/3241
382/103
8,396,282 B1 * 3/2013 Huber ................. G06K 9/4623
381/56

(Continued)

FOREIGN PATENT DOCUMENTS

JP     2003-062777        3/2003
KR    1020090116089 A    11/2009

(Continued)

OTHER PUBLICATIONS

Schauerte, Boris, et al. "Multi-modal and multi-camera attention in smart environments." Proceedings of the 2009 international conference on Multimodal interfaces. ACM, 2009.*

(Continued)

*Primary Examiner* — Stephen R Koziol
*Assistant Examiner* — Jonathan S Lee
(74) *Attorney, Agent, or Firm* — Ohlandt Greeley Ruggiero & Perle L.L.P.

(57) ABSTRACT

A monitoring device is provided, which includes an inputter configured to receive an input of a plurality of images captured at separate positions and a plurality of sound sources heard at separate positions, a saliency map generator configured to generate a plurality of mono saliency maps for the plurality of images and to generate a dynamic saliency map using the plurality of mono saliency maps generated, a position determinator configured to determine the positions of the sound sources through analysis of the plurality of sound sources, a scan path recognizer configured to generate scan paths of the plurality of images based on the generated dynamic saliency map and the determined positions of the sound sources, and an outputter configured to output the generated scan paths.

16 Claims, 13 Drawing Sheets

(51) Int. Cl.
*H04N 7/18* (2006.01)
*G10L 15/25* (2013.01)
*G06K 9/46* (2006.01)

(56) References Cited

U.S. PATENT DOCUMENTS

| | | | |
|---|---|---|---|
| 2003/0055532 | A1 | 3/2003 | Sakagami et al. |
| 2009/0018696 | A1* | 1/2009 | Goerick ............ B25J 9/161 700/245 |
| 2009/0279714 | A1 | 11/2009 | Kim et al. |
| 2011/0004341 | A1* | 1/2011 | Sarvadevabhatla .... B25J 9/1602 700/250 |
| 2011/0026766 | A1* | 2/2011 | Eshima .............. G06K 9/00744 382/103 |

FOREIGN PATENT DOCUMENTS

| | | |
|---|---|---|
| KR | 1020110109691 A | 10/2011 |
| KR | 1020110129158 A | 12/2011 |

OTHER PUBLICATIONS

Ban, Sang-Woo, Inwon Lee, and Minho Lee. "Dynamic visual selective attention model." Neurocomputing 71.4 (2008): 853-856.*

Jeong, Sungmoon, Sang-Woo Ban, and Minho Lee. "Stereo saliency map considering affective factors and selective motion analysis in a dynamic environment." Neural networks 21.10 (2008): 1420-1430.*

çetingül, Hasan Ertan, et al. "Multimodal speaker/speech recognition using lip motion, lip texture and audio." Signal processing 86.12 (2006): 3549-3558.*

Hong, Richang, et al. "Video accessibility enhancement for hearing-impaired users." ACM Transactions on Multimedia Computing, Communications, and Applications (TOMM) 7.1 (2011): 24.*

International Search Report dated Mar. 22, 2013 corresponding to PCT/KR2012/010480, 2 pp.

* cited by examiner

FIG. 11
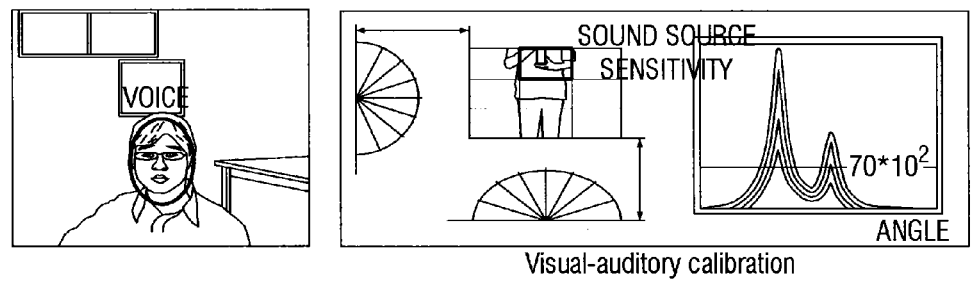
Visual-auditory calibration
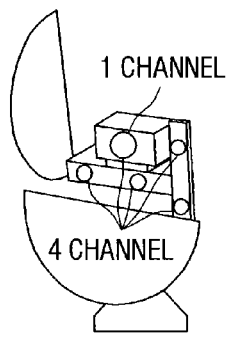
1 CHANNEL
4 CHANNEL
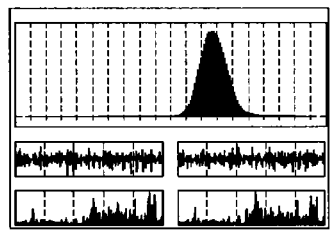
DETERMINE LEFT/RIGHT
SOUND SOURCE POSITION
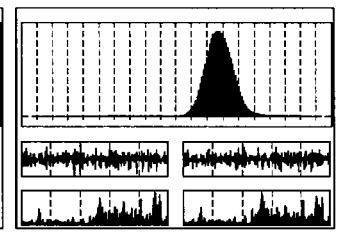
DETERMINE UPPER/LOWER
SOUND SOURCE POSITION

MONITORING DEVICE USING SELECTIVE ATTENTION MODEL AND METHOD FOR MONITORING SAME

TECHNICAL FIELD

The present disclosure relates to a monitoring device and a monitoring method, and more particularly to a monitoring device using a selective attention model based on audio-visual integrated information and a monitoring method therein.

BACKGROUND ART

A monitoring device performs a function of accurately identifying an input image and sound using sensor technology. The sensor technology that is used in the monitoring device starts from imitation of human sensory organs. Recently, the importance of an active artificial visual system and voice recognition system has been highlighted as the sensor technology.

However, many artificial visual systems that have been developed up to now lay stress on detection and recognition of a specific object in an input image, and thus do not have a solution to the problem in a start stage of the visual system, such as how to effectively select, like a human visual system, necessary information from a natural image of a real world environment having high complexity.

Further, the existing voice recognition system has the problem that, since much noise exists in the real world environment, it is difficult to determine when to perform the voice recognition using only a voice signal, and it occurs frequently to execute the voice recognition by the noise rather than a speaker.

Accordingly, there has been a need for a method for overcoming limitations of the existing artificial visual system and voice recognition system.

DISCLOSURE

Technical Problem

The present disclosure has been made to address at least the above needs and to provide at least the advantages described below, and an aspect of the present disclosure is to provide a monitoring device that provides a scan path that is similar to a human scan path using an attention model based on audio-visual integrated information.

Another aspect of the present disclosure is to provide a monitoring device that can easily perform voice recognition through accurate grasping of a time when a speaker who is targeted for monitoring speaks using an attention model based on audio-visual integrated information.

Technical Solution

According to one aspect of the present disclosure, a monitoring device includes an inputter configured to receive an input of a plurality of images captured at separate positions and a plurality of sound sources heard at separate positions; a saliency map generator configured to generate a plurality of mono saliency maps for the plurality of images and to generate a dynamic saliency map using the plurality of mono saliency maps generated; a position determinator configured to determine the positions of the sound sources through analysis of the plurality of sound sources; a scan path recognizer configured to generate scan paths of the plurality of images based on the generated dynamic saliency map and the determined positions of the sound sources; and an outputter configured to output the generated scan paths.

The saliency map generator may include an image information extractor configured to extract at least one piece of image information including brightness, edges, symmetry, and complementary colors of the input images; a CSD (Center-Surround Difference) processor configured to perform CSD and normalization of the extracted image information and to output at least one feature map of a brightness feature map, a direction feature map, a symmetry feature map, and a color feature map; and an ICA (Independent Component Analysis) processor configured to perform ICA of the output feature map and to generate the mono feature maps.

The saliency map generator may further include a combiner configured to combine the plurality of mono saliency maps generated by the ICA processor and to generate the dynamic saliency map.

The saliency map generator may generate the plurality of mono saliency maps using a biology-based selective attention model.

The scan path recognizer may give priorities to a plurality of salient points that are included in the generated dynamic saliency map based on the determined sound source positions through reinforcement or suppressing of the plurality of salient points and may generate the scan paths according to the given priorities.

The inputter may receive the input of the plurality of images and the plurality of sound sources in a preset time period.

According to another aspect of the present disclosure, a monitoring method in a monitoring device includes receiving an input of a plurality of images captured at separate positions and a plurality of sound sources heard at separate positions; generating a plurality of mono saliency maps for the plurality of images; generating a dynamic saliency map using the plurality of mono saliency maps generated; determining the positions of the sound sources through analysis of the plurality of sound sources; generating scan paths of the plurality of images based on the generated dynamic saliency map and the determined positions of the sound sources; and outputting the generated scan paths.

The generating the plurality of mono saliency maps may include extracting at least one piece of image information including brightness, edges, symmetry, and complementary colors of the input image; performing a CSD (Center-Surround Difference) and normalization of the extracted image information to output at least one feature map of a brightness feature map, a direction feature map, a symmetry feature map, and a color feature map; and performing an ICA (Independent Component Analysis) of the output feature map to generate the mono feature maps.

The generating the dynamic saliency map may include combining the plurality of mono saliency maps generated by the ICA processor and generating the dynamic saliency map.

The generating the plurality of mono saliency maps may include generating the plurality of mono saliency maps using a biology-based selective attention model.

The generating the scan paths may include giving priorities to a plurality of salient points that are included in the generated dynamic saliency map based on the determined sound source positions through reinforcement or suppressing of the plurality of salient points, and generating the scan paths according to the given priorities.

The receiving the input may include receiving the input of the plurality of images and the plurality of sound sources in a preset time period.

According to still another aspect of the present disclosure, a monitoring device includes an inputter configured to receive an input of a plurality of images obtained by capturing a user and a sound source; a detector configured to detect lip regions of the user from the plurality of images; a saliency map generator configured to generate a dynamic saliency map of the detected lip regions of the plurality of images; an information acquirer configured to acquire lip motion information using the generated dynamic saliency map; a voice recognizer configured to perform voice recognition of the input sound source based on the acquired motion information; and an outputter configured to output the result of the voice recognition.

The detector may include a face detector configured to detect face regions of the user from the plurality of images; and a lip detector configured to detect lip regions of the user in the detected face regions.

The face detector may detect the face regions of the user using an Adaboost algorithm, and the lip detector may detect the lip regions using pre-stored templates.

The lip detector may extract the detected lip regions from the plurality of images and generate a plurality of extracted images.

The saliency map generator may generate a plurality of mono saliency maps for the plurality of extracted images and may generate a dynamic saliency map using the plurality of mono saliency maps generated.

The motion information may include at least one piece of time point information of time point information when the user speaks, chunking time point information, and time point information when user speaking is ended.

The voice recognizer may perform voice recognition only for the sound source input at a time point when the user speaks based on the acquired motion information.

The inputter may receive a plurality of sound sources heard at separate positions, the monitoring device may further include a position determinator configured to determine generation positions of the sound sources through analysis of the plurality of sound sources, and the voice recognizer may perform the voice recognition of the input sound sources based on the acquired motion information and the determined generation positions of the sound sources.

According to yet still another aspect of the present disclosure, a monitoring method includes receiving an input of a plurality of images obtained by capturing a user and sound sources; detecting detect lip regions of the user from the plurality of images; generating a dynamic saliency map of the detected lip regions of the plurality of images; acquiring lip motion information using the generated dynamic saliency map; performing voice recognition of the input sound sources based on the acquired motion information; and outputting the result of the voice recognition.

The detecting may include detecting face regions of the user from the plurality of images; and detecting lip regions of the user in the detected face regions.

The detecting the face regions may include detecting the face regions of the user using an Adaboost algorithm, and the detecting the lip regions may include detecting the lip regions using pre-stored templates.

The monitoring method according to the aspect of the present disclosure may further include extracting the detected lip regions from the plurality of images and generating a plurality of extracted images.

The generating the dynamic saliency map may include generating a plurality of mono saliency maps for the plurality of extracted images and generating dynamic saliency map using the plurality of mono saliency maps generated.

The motion information may include at least one piece of time point information of time point information when the user speaks, chunking time point information, and time point information when user speaking is ended.

The performing the voice recognition may include performing voice recognition only for the sound sources input at a time point when the user speaks based on the acquired motion information.

The receiving the input may include receiving the plurality of sound sources heard at separate positions, the monitoring method may further include determining generation positions of the sound sources through analysis of the plurality of sound sources, and the performing the voice recognition may include performing the voice recognition of the input sound sources based on the acquired motion information and the determined generation positions of the sound sources.

Advantageous Effects

As described above, according to the monitoring device and the monitoring method according to the embodiments of the present disclosure, the scan paths which are similar to the human scan paths that simultaneously consider the dynamic motions of the images and the positions of the sound sources can be provided through integration of the audio-visual information, and thus high reliability can be obtained.

Further, according to the monitoring device and the monitoring method according to the embodiments of the present disclosure, the time point when the speaker who is targeted for monitoring speaks, the chunking time point, and the speaking end time point can be detected through integration of the audio-visual information, and thus the sound source to which the voice recognition is to be performed can be selected.

DESCRIPTION OF DRAWINGS

FIG. 11 is a diagram explaining the operation of a position determinator of a monitoring device according to a second embodiment of the present disclosure;

MODE FOR INVENTION

Hereinafter, embodiments of the present disclosure are described in detail with reference to the accompanying drawings.

A monitoring device according to the present disclosure may be implemented as a security system, a monitoring system, or a robot vision system.

Figure 1:
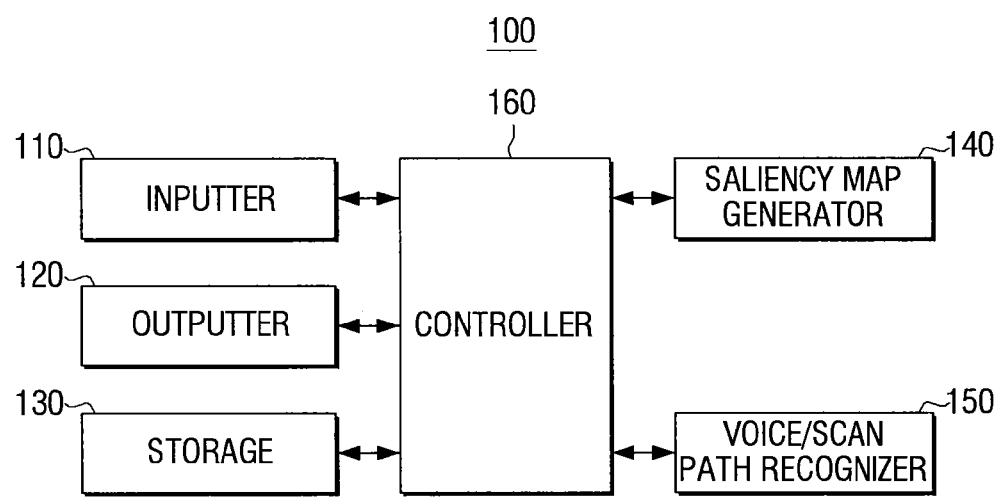
FIG. 1 is a block diagram illustrating the configuration of a monitoring device according to an embodiment of the present disclosure.

FIG. 1 is a block diagram illustrating the configuration of a monitoring device according to an embodiment of the present disclosure.

Referring to FIG. 1, a monitoring device 100 according to this embodiment may include an inputter 110, an outputter 120, a storage 130, a saliency map generator 140, a voice/scan path recognizer 150, and a controller 160.

The inputter 110 receives an input of a plurality of images captured and a plurality of sound sources heard. Specifically, the inputter 110 may receive a plurality of images that are captured by an image capturing device, such as an external digital camera or an external camcorder. Further, the inputter 110 may receive a plurality of sound sources through a microphone having a plurality of channels.

It is described that the images and the sound sources are received from the external devices. However, in implementation, an image pickup device and/or a voice read device may be provided in the monitoring device 100.

The outputter 120 may output the recognized voice and scan path. Specifically, the outputter 120 may be implemented by a display device, such as a monitor, and may display both an image input through the inputter 110 and the scan path for the corresponding image. Further, the outputter 120 may display the result of voice recognition.

Here, the scan path means a path for monitoring a place where a large amount of information is generated, that is, an attention path, through analysis of the amount of information.

The outputter 120 may transmit the recognized voice and scan path to an external device.

The storage 130 stores input images and input sound sources. Specifically, the storage 130 may store a plurality of images and a plurality of sound sources input through the inputter 110. The storage 130 may temporarily store saliency maps generated by the saliency map generator 140 to be described later, and the scan paths and the result of the voice recognition generated by the voice/scan path recognizer 160 to be described later.

The storage 130 may be a memory mounted inside the scan path providing device 100, for example, a ROM, a flash memory, or an HDD, or may be an external HDD or a memory card connected to the scan path providing device 100, for example, a flash memory (M/S, xD, or SD) or a USB memory.

The saliency map generator 140 generates a dynamic saliency map using the plurality of images. The detailed configuration and operation of the saliency map generator 140 will be described in the following embodiments.

The voice/scan path recognizer 150 recognizes the voice and scan path using the generated dynamic saliency map. The details of the voice recognition and the scan path recognition will be described in the following embodiments.

The function of the voice/scan path recognizer 150 may be implemented to be integrated into the saliency map generator 140.

The controller 160 controls respective constituent elements of the monitoring device 100. Specifically, if a plurality of images and a plurality of sound sources are input through the inputter 110, the controller 160 may control the saliency map generator 140 to generate the dynamic saliency map for the input images.

According to the monitoring device 100 as described above with reference to FIG. 1, the scan paths which are similar to the human scan paths that simultaneously consider the dynamic motions of the images and the positions of the sound sources can be provided through integration of the audio-visual information, and thus high reliability of the monitoring device can be obtained.

Further, according to the monitoring device 100 of FIG. 1, the time point when the speaker who is targeted for monitoring speaks, the chunking time point, and the speaking end time point can be detected through integration of the audio-visual information, and thus the sound source to which the voice recognition is to be performed can be selected.

Hereinafter, a monitoring device 100 according to two embodiments will be described. According to the first embodiment, a monitoring device 100 that provides a scan path that is similar to the human scan path is exemplified, and according to the second embodiment, a monitoring device 100 that provides voice recognition with high reliability is exemplified. The first embodiment and the second embodiment may be implemented by different monitoring devices or one monitoring device having the configurations of the first and second embodiments.

The monitoring device 100 according to the first embodiment may be implemented by a scan path providing device, and the monitoring device 100 according to the second embodiment may be implemented by a voice recognition device.

Hereinafter, referring to FIGS. 2 to 6, a monitoring device 100 according to a first embodiment will be described.

Figure 2:
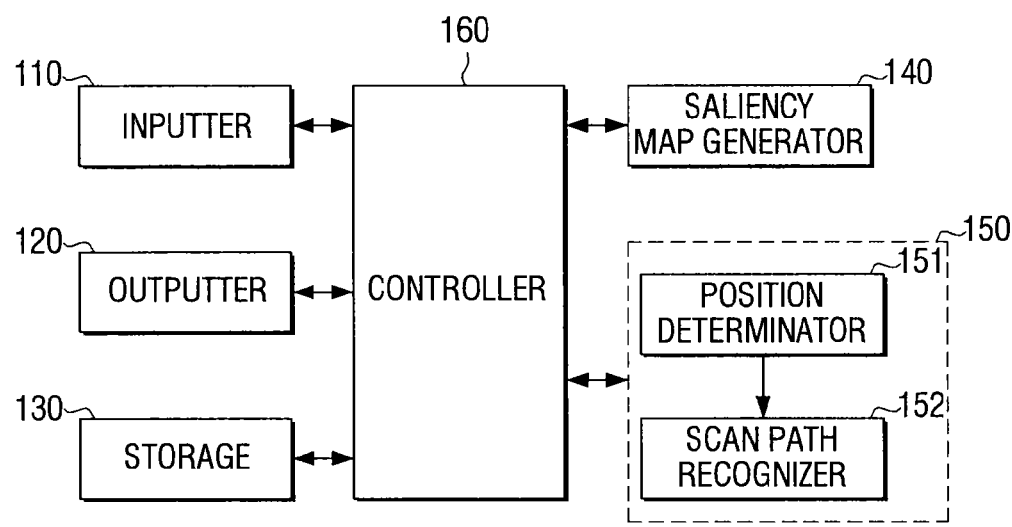
FIG. 2 is a block diagram illustrating the configuration of a monitoring device according to a first embodiment of the present disclosure.

FIG. 2 is a block diagram illustrating the configuration of a monitoring device 100 according to a first embodiment of the present disclosure.

Referring to FIG. 2, a monitoring device 100 according to the first embodiment may include an inputter 110, an outputter 120, a storage 130, a saliency map generator 140, a voice/scan path recognizer 150, and a controller 160. In this embodiment, it is described that the monitoring device is used as a device for simply grasping scan paths to be selectively attended. However, the monitoring device according to this embodiment may be implemented as one configuration of a scan path providing device, a robot vision system, a security system, or a surveillance system.

As described above with reference to FIG. 1, the scan path means a path for monitoring a place where a large amount of information is generated, that is, an attention path, through analysis of the amount of information.

The inputter 110 receives an input of a plurality of images captured at separate positions and a plurality of sound sources heard at separate positions. Specifically, the inputter 110 may receive a plurality of images that are captured by an image capturing device, such as an external digital camera or an image reading device (scanner). Further, the inputter 110 may receive a plurality of sound sources through a microphone having a plurality of channels.

The outputter 120 may output the recognized scan path. Specifically, the outputter 120 may be implemented by a display device, such as a monitor, and may display both images input through the inputter 110 and the scan paths for the corresponding images.

The storage 130 stores input images and input sound sources. Specifically, the storage 130 may store a plurality of images and a plurality of sound sources input through the inputter 110. The storage 130 may temporarily store saliency maps generated by the saliency map generator 140 to be described later, and the scan paths generated by a scan path recognizer 152 to be described later. Further, the storage 130 may be a memory mounted inside the monitoring device 100, for example, a ROM, a flash memory, or an HDD, or may be an external HDD or a memory card connected to the monitoring device 100, for example, a flash memory (M/S, xD, or SD) or a USB memory.

The saliency map generator 140 generates a plurality of mono saliency maps for the plurality of images, and generates a dynamic saliency map using the plurality of mono saliency maps generated. The detailed configuration and operation of the saliency map generator 140 will be described later with reference to FIG. 3.

The voice/scan path recognizer 150 may include a position determinator 151 and the scan path recognizer 152.

The position determinator 151 determines the positions of the sound sources through analysis of the plurality of sound sources (e.g., stereo sound sources). Specifically, the position determinator 151 may determine the positions where the sound sources are generated through analysis of a phase difference between the plurality of input sound sources. Since this operation is well known in the art, the detailed description thereof will be omitted.

Although it is described that the position determinator 151 is one configuration of the voice/scan path recognizer 150, it may be implemented as one configuration of a separate independent monitoring device 100.

The scan path recognizer 152 generates scan paths of the plurality of images based on the generated a dynamic saliency map and the determined positions of the sound sources. Specifically, the scan path recognizer 152 may give priorities to a plurality of salient points that are included in the dynamic saliency map generated by the saliency map generator 140 based on the sound source positions determined by the position determinator 151 through performing of reinforcement or suppressing of the plurality of salient points, and may generate the scan paths according to the given priorities.

The function of the voice/scan path recognizer 150 may be implemented to be integrated into the saliency map generator 150.

The voice/scan path recognizer 150 may operate using a biology-based selective attention model. Here, the biology-based selective attention model is obtained by modeling a human perception structure and a partial process thereof, and may be divided into data-driven processing that immediately reacts on the input image and concept-driven processing that uses learned information. Since the data-driven processing and the concept-driven processing are well known in the art, the detailed description thereof will be omitted.

The controller 160 controls respective constituent elements of the monitoring device 100. Specifically, if a plurality of images and a plurality of sound sources are input through the inputter 110, the controller 160 may control the saliency map generator 140 to generate the dynamic saliency map for the input images, and may control the position determinator 151 to determine the positions of the plurality of sound sources. Further, the controller 160 may control the scan path generator 151 to generate user's scan paths based on the generated dynamic saliency map and the positions of the sound sources. The controller 160 may control the outputter 120 to display the generated scan paths.

Accordingly, the monitoring device 100 according to this embodiment simultaneously considers the dynamic motions of the images and the positions of the sound sources through integration of the audio-visual information, and thus can recognize and generate the scan paths with high reliability in selecting the information.

In this embodiment, it is described that the generated scan paths are displayed through the outputter. In implementation, the generated scan paths may be stored in the storage 130, may be printed through a printing device, or may be transmitted to a specific device.

Figure 3:
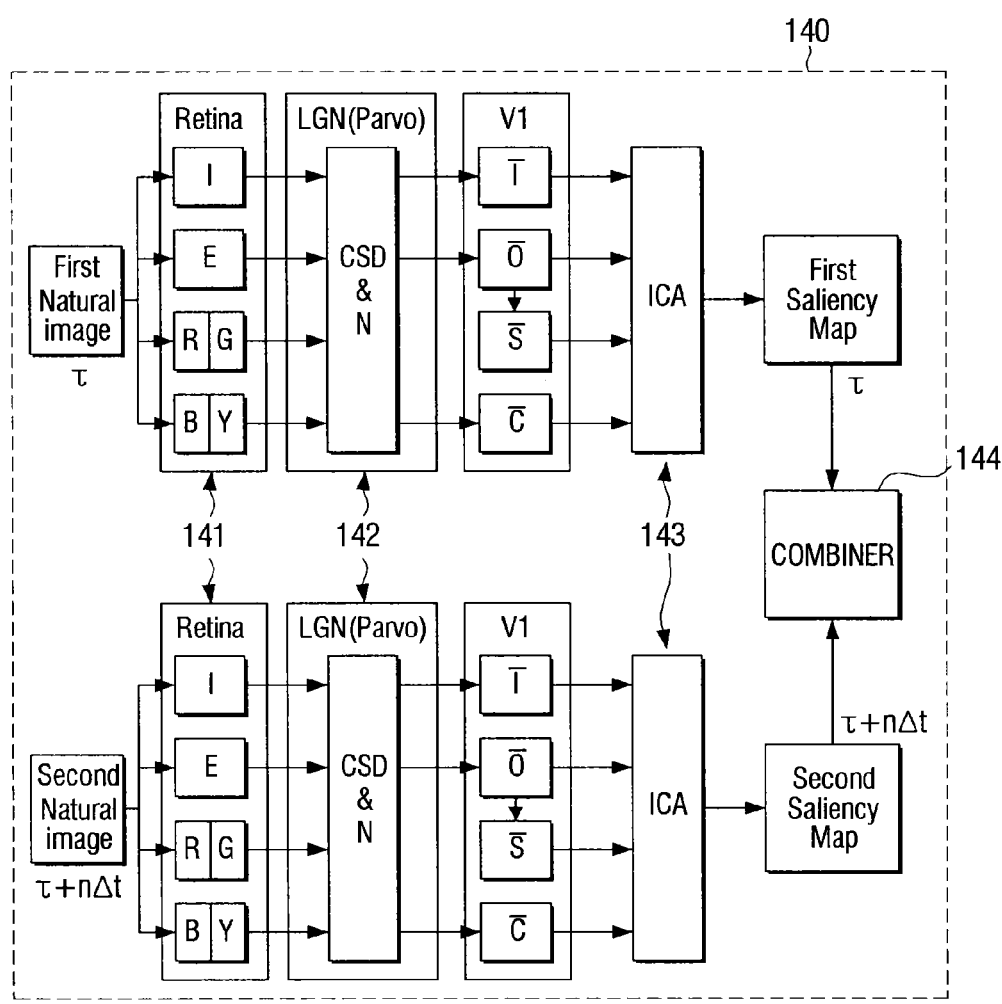
FIG. 3 is a block diagram illustrating the detailed configuration of a saliency map generator of a monitoring device according to a first embodiment of the present disclosure.

FIG. 3 is a block diagram illustrating the detailed configuration of a saliency map generator of a monitoring device according to a first embodiment of the present disclosure.

Referring to FIG. 3, the saliency map generator 140 may include an image information extractor 141, a CSD (Center-Surround Difference) processor 142, an ICA (Independent Component Analysis) processor 143, and a combiner 144.

In FIG. 3, a second natural image means an image that is input with a predetermined time difference $\Delta t$ after a first natural image.

The image information extractor 141 extracts image information, such as brightness I, edges E, and complementary colors RG and BY, of the input image. Specifically, at least one piece of image information, such as brightness, edges, symmetry, and complementary colors, of the input image may be extracted based on R (Red), G (Green), and B (Blue) values of the input image.

The CSD processor 142 may perform CSD and normalization of the extracted image information and generate a brightness feature map, a direction feature map, a symmetry feature map, and a color feature map.

The ICA processor 143 may perform ICA of the output feature map and generate the mono SM (Saliency Map).

As described above, using the image information extractor 141, the CSD processor 142, and the ICA processor 143, mono saliency maps for the respective images are generated.

The combiner 144 generates the dynamic saliency map through combination of the plurality of mono saliency maps that are generated by the ICA processor 143 with the time difference $$S_C(V)=S_P(1+\exp^{-z/\tau})L(sp \cdot v \cdot \sigma) \quad \text{[Equation 1]}$$

Here, $S_p(v)$ denotes a bottom-up saliency map in which depth information is not considered, and $L(sp \cdot v \cdot \sigma)$ denotes a Laplace's equation like Equation 2

$$L(sp \cdot v \cdot \sigma) = C\left(\frac{|v-sp|^2 - 2\sigma^2}{\sigma^4}\right)\exp{\frac{-|v-sp|^2}{2\sigma^2}} \quad \text{[Equation 2]}$$

Even if the dynamic saliency map as illustrated in FIG. 3 makes a saliency map that is similar to a human selective attention function, the salient regions may be regions with which a human is unconcerned or regions with which a human should be more concerned. This is because the saliency maps are generated using only primitive features, such as, complementary colors, brightness, edges, and symmetry. In order to solve this point, saliency regions of the dynamic saliency map may be suppressed or reinforced through reflection thereof in auditory information. This operation may be modeled by Fuzzy ART neural network.

Figure 4:
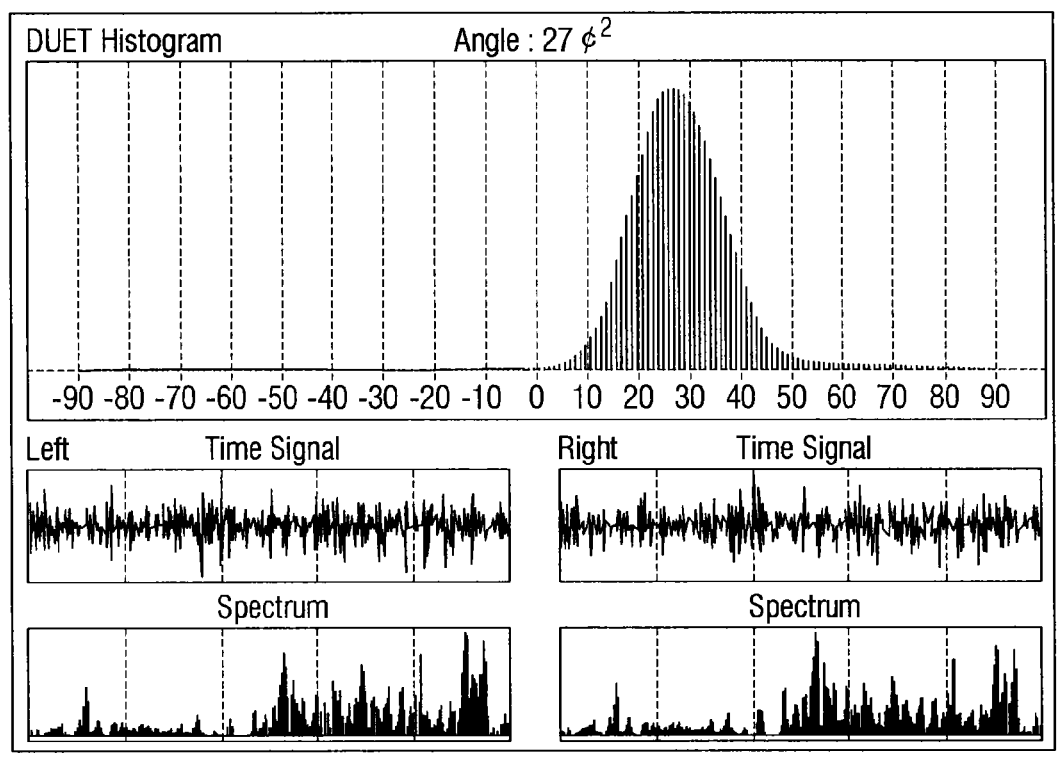
FIG. 4 is a diagram explaining the operation of a position determinator of a monitoring device according to a first embodiment of the present disclosure.

FIG. 4 is a diagram explaining the operation of a position determinator of a monitoring device according to a first embodiment of the present disclosure.

Referring to FIG. 4, if two sound sources (e.g., stereo sound sources) are input to the inputter, the position determinator 151 may analyze spectrums of the respective sound sources and predict the positions where the sound sources are generated through the analyzed spectrums of the sound sources.

Figure 5:
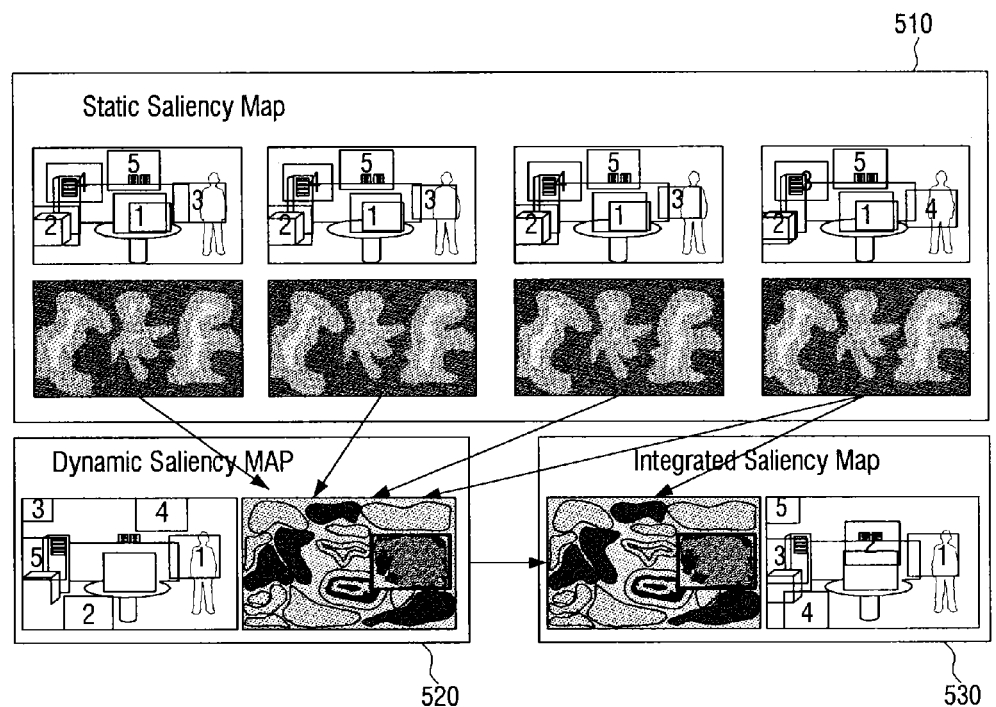
FIG. 5 is a diagram explaining the operation of a saliency map generator of a monitoring device according to a first embodiment of the present disclosure.

FIG. 5 is a diagram explaining the operation of a saliency map generator of a monitoring device according to a first embodiment of the present disclosure.

Referring to FIG. 5, a plurality of saliency maps 510 generated by the ICA processor 143, a dynamic saliency map 520 generated by the combiner 144, and a final saliency map 530 are illustrated.

The plurality of mono saliency maps 510 may correspond to the plurality of images input through the inputter 110 with a time difference.

The dynamic saliency map 520 is a saliency map that is generated through combination of the plurality of mono saliency maps output from the ICA processor 144.

The final saliency map 430 is a saliency map that is generated through performing of reinforcement and suppressing of the saliency regions of the dynamic saliency map 520 according to the positions of the sound sources determined by the position determinator 151.

Figure 6:
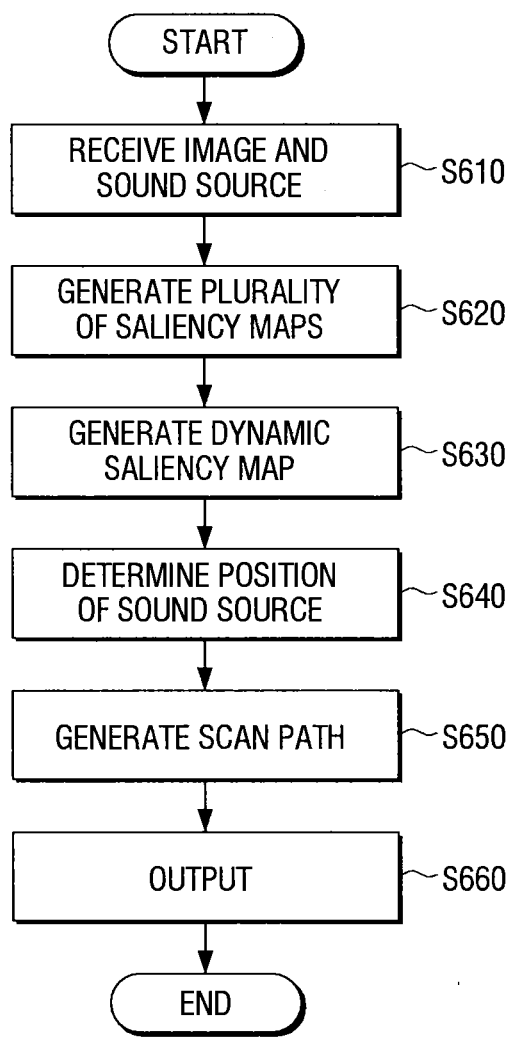
FIG. 6 is a flowchart illustrating a monitoring method according to a first embodiment of the present disclosure.

FIG. 6 is a flowchart illustrating a monitoring method according to a first embodiment of the present disclosure.

A plurality of images captured at separate positions and a plurality of sound sources heard at separate positions are input (S610). Specifically, the plurality of images that are captured by an image capturing device, such as an external digital camera or an image reading device (scanner), may be input. Further, the plurality of sound sources may be input through a microphone having a plurality of channels.

Then, a plurality of mono saliency maps for the plurality of images are generated (S620). Specifically, at least one piece of image information including brightness, edges, symmetry, and complementary colors of the input images is extracted, and CSD (Center-Surround Difference) and normalization of the extracted image information is performed. Further, at least one feature map of a brightness feature map, a direction feature map, a symmetry feature map, and a color feature map is output, and an ICA (Independent Component Analysis) of the output feature map is performed to generate the mono feature maps.

A dynamic saliency map is generated using the plurality of mono saliency maps generated (S630). Specifically, the dynamic saliency map may be generated through combination of the plurality of mono saliency maps generated.

Then, the positions of the sound sources are determined through analysis of the plurality of sound sources (S640). Specifically, the positions where the sound sources are generated may be determined through analysis of a phase difference between the plurality of sound sources input. On the other hand, the determining the positions of the sound sources may be executed prior to the generating the mono saliency maps (S620).

Scan paths of the plurality of images are generated based on the generated dynamic saliency map and the determined positions of the sound sources (S650). Specifically, priorities may be given to a plurality of salient points that are included in the generated dynamic saliency map based on the determined sound source positions through reinforcement or suppressing of the plurality of salient points, and the scan paths may be generated according to the given priorities.

The generated scan paths are output (S660). Specifically, the generated scan paths may be output through a display device, such as a monitor. At this time, the input images and the scan paths for the corresponding images may be displayed together.

According to the monitoring method according to this embodiment, the dynamic motions of the images and the positions of the sound sources are simultaneously considered through integration of the audio-visual information, and thus the scan paths can be generated with high reliability in selecting the information. The monitoring method as illustrated in FIG. 6 may be executed on the monitoring device having the configuration of FIG. 2 or a monitoring device having any other configuration.

Hereinafter, referring to FIGS. 7 to 13, a monitoring device 100 according to a second embodiment will be described. The monitoring device 100 according to the second embodiments may be the monitoring device 100 that provides voice recognition with high reliability, and may be implemented as a voice recognition device.

Figure 7:
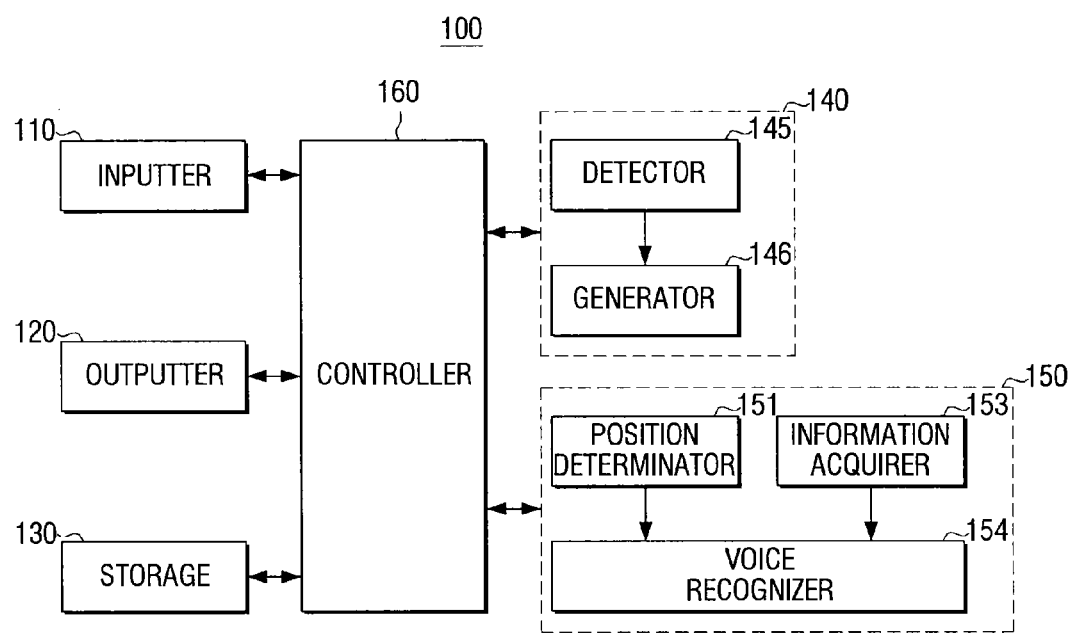
FIG. 7 is a block diagram illustrating the configuration of a monitoring device according to a second embodiment of the present disclosure.

FIG. 7 is a block diagram illustrating the configuration of a monitoring device 100 according to a second embodiment of the present disclosure.

Referring to FIG. 7, a monitoring device 100 according to this embodiment may include an inputter 110, an outputter 120, a storage 130, a saliency map generator 140, a voice/scan path recognizer 150, and a controller 160. In this embodiment, it is described that the monitoring device is used as a device for simply grasping scan paths. However, the monitoring device according to this embodiment may be implemented as one configuration of a robot vision system, a security system, or a surveillance system.

The inputter 110 receives an input of a plurality of images obtained by capturing a user and a sound source. Specifically, the inputter 110 may receive a plurality of images that are captured by an image capturing device, such as an external digital camera or an external camcorder. Further, the inputter 110 may receive a sound source through an external microphone.

It is illustrated and described that the images and the sound source are input from the external device. However, in implementation, an image pickup device and/or a voice reading device may be provided in the monitoring device 100.

Further, it is described that the inputter 110 receives one sound source. However, in implementation, the inputter 110 may receive a plurality of sound sources heard at separate positions, and in this case, the input sound sources may be provided to a position determinator 151 to be described later.

The outputter 120 may output the result of the voice recognition. Specifically, the outputter 120 may be implemented by a display device, such as a monitor, and may display the result of the voice recognition that is performed by a voice recognizer 154 to be described later. Further, the outputter 120 may transmit the result of the voice recognition to an external device.

The storage 130 stores input images and input sound sources. Specifically, the storage 130 may store a plurality of images and sound sources input through the inputter 110. The storage 130 may temporarily store region information detected by a detector 145 to be described later and extracted images. Further, the storage 130 may temporarily store saliency maps generated by a saliency map generator 146 to be described later, information acquired by an information acquirer 153 to be described alter, and the result of the voice recognition performed by the voice recognizer 154 to be described later.

Further, the storage 130 may be a memory mounted inside the monitoring device 100, for example, a ROM, a flash memory, or an HDD, or may be an external HDD or a memory card connected to the monitoring device 100, for example, a flash memory (M/S, xD, or SD) or a USB memory.

The saliency map generator 140 may include a detector 145 and a generator 146, and may generate saliency maps.

The detector 145 detects lip regions of a user for the plurality of images. Specifically, the detector 145 may include a face detector (not illustrated) and a lip detector (not illustrated).

The face detector detects face regions of the user from the plurality of images. Specifically, the face detector may detect the face regions of the user from the plurality of images using an Adaboost algorithm. The detailed operation of the face detector will be described later with reference to FIG. 8.

The lip detector detects the lip region of the user in the detected face region. Specifically, the lip detector may detect the lip region of the face region detected by the face detector using pre-stored templates. Further, the lip detector may extract the detected lip regions from the plurality of images and generate a plurality of extracted images. The detailed operation of the lip detector will be described later with reference to FIG. 9.

The generator 146 generates a dynamic saliency map for the lip regions detected from the plurality of images. Specifically, the generator 146 may generate a plurality of mono saliency maps using the plurality of extracted images generated by the lip detector, and may generate the dynamic saliency map using the generated mono saliency maps. The detailed operation of the generator 146 will be described later with reference to FIG. 4.

The voice/scan path recognizer 150 may include a position determinator 151, an information acquirer 152, and a voice recognizer 154.

The position determinator 151 determines the positions of the sound sources through analysis of the plurality of sound sources (e.g., stereo sound sources). Specifically, the position determinator 151 may determine the positions where the sound sources are generated through analysis of a phase difference between the plurality of input sound sources. It is illustrated and described that only two channels are used. However, in implementation, it is also possible to use a sound source having four channels. This will be described later with reference to FIG. 11.

On the other hand, it is described that the position determinator 151 is one configuration of the voice/scan path recognizer 150, but is not limited thereto. The position determinator 151 may be implemented as a separate independent configuration.

The information acquirer 153 acquires lip motion information using the generated dynamic saliency map. Specifically, the information acquirer 153 may grasp a time point when the user speaks, a chunking time point, and a time point when user speaking is ended using the generated dynamic saliency map, and may acquire the corresponding motion information. This will be described later with reference to FIG. 12.

It is described that the information acquirer 153 is one configuration of the voice/scan path recognizer 150, but is not limited thereto. The information acquirer 153 may be implemented as a separate independent configuration.

The voice recognizer 154 performs voice recognition for the input sound source based on the acquired motion information. Specifically, the voice recognizer 154 may perform the voice recognition using only the sound source at the time point when the user actually speaks based on the acquired motion information. Further, the voice recognizer 154 may perform the voice recognition for the sound source based on the acquired motion information and the position where the sound source is generated that is determined by the position determinator 151. The voice recognition using the sound source may be performed using a well known method in the art.

The controller 160 controls respective constituent elements of the monitoring device 100. Specifically, if a plurality of images and sound sources are input through the inputter 110, the controller 160 may control the detector 145 to detect the lip regions of the input images and may control the saliency map generator 140 to generate the dynamic saliency map for the detected lip regions. Further, if a plurality of sound sources are input, the controller 160 may control the position determinator 151 to determine the positions of the input sound sources. Further, the controller 160 may control the information acquirer 153 to acquire the motion information based on the generated dynamic saliency map, and may control the voice recognizer 154 to perform the voice recognition for the input sound sources based on the acquired motion information and the generation positions of the sound sources.

Accordingly, the monitoring device 100 according to this embodiment may detect the time point when the user speaks, the chunking time point, and the time point when user speaking is ended using visual information, and may select the sound source for which the voice recognition is to be performed. Further, since the visual information and the positions of the sound sources are simultaneously considered, the sound source recognition may be performed with high reliability.

Figure 8:
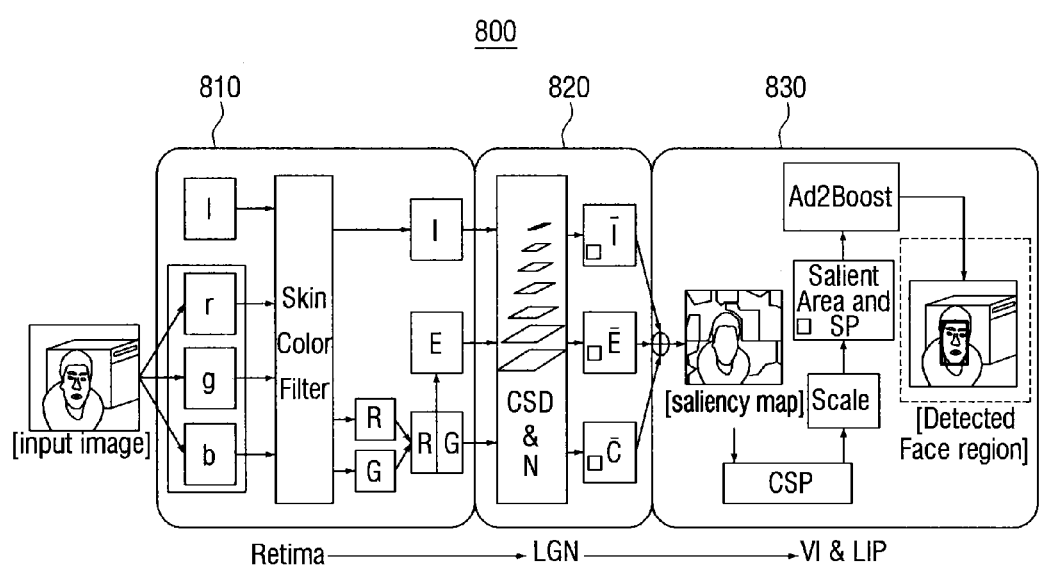
FIG. 8 is a diagram illustrating the detailed configuration of a face detector of a monitoring device according to a second embodiment of the present disclosure.

FIG. 8 is a diagram illustrating the detailed configuration of a face detector of a monitoring device according to a second embodiment of the present disclosure.

Referring to FIG. 8, a face detector 800 detects a user's face region using a biology-based selective attention module. Specifically, the face detector 800 may include an image information extractor 810, a CSD processor 820, and an ICA processor 830.

The image information extractor 810 extracts image information including brightness I, edges E, and complementary colors RG and BY of the input image. Specifically, the image information extractor 810 may extract at least one piece of image information of the brightness, edges, symmetry, and complementary colors of the input image based on R (Red), G (Green), and B (Blue) values of the input image.

The CSD processor 820 may perform CSD and normalization of the extracted image information and may generate a brightness feature map $\bar{I}$, an edge feature map $\bar{E}$, and a color feature map $\bar{C}$.

Further, the ICA processor 830 performs ICA of the output feature map and generates the mono SM (Saliency Maps).

The ICA processor 830 may detect face candidate regions by preferentially selecting four regions having high energy values per unit area from the generated mono SM.

Further, the ICA processor 830 may detect the face region using an Adaboost algorithm with respect to the detected face candidate regions. The Adaboost algorithm is an algorithm for designing a "strong" classifier through linear combination of "simple" and "weak" classifiers. Using the Adaboost algorithm, the face region can be detected in a short time.

Figure 9:
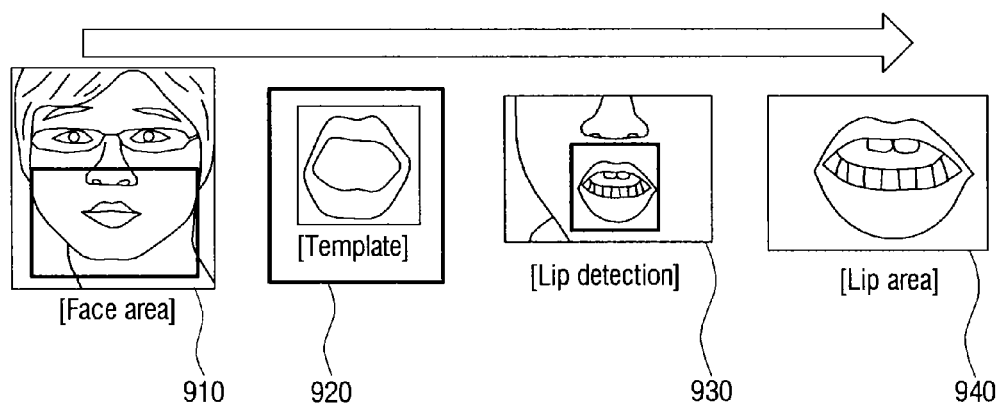
FIG. 9 is a diagram explaining the detailed configuration of a lip detector of a monitoring device according to a second embodiment of the present disclosure.

FIG. 9 is a diagram explaining the detailed configuration of a lip detector of a monitoring device according to a second embodiment of the present disclosure.

Referring to FIG. 9, a lip detector may limit a region (specifically, region having a red color) that may be estimated as a lip region with respect to the face region 910 detected by the face detector, and detect the region having the highest correlation value as the lip region through comparison of the limited region with a pre-stored template.

Further, the lip detector may generate an extracted image to be used in the following process through extraction and enlargement of the detected lip region.

Figure 10:
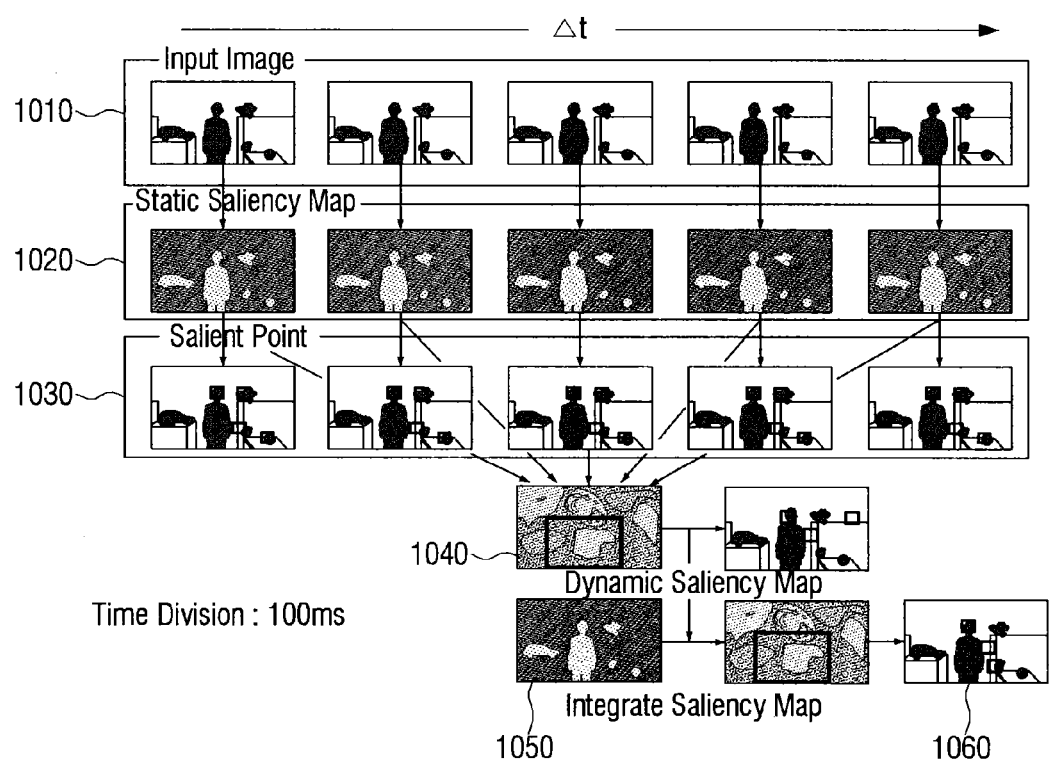
FIG. 10 is a diagram explaining the operation of a saliency map generator of a monitoring device according to a second embodiment of the present disclosure.

FIG. 10 is a diagram explaining the operation of a saliency map generator of a monitoring device according to a second embodiment of the present disclosure.

Referring to FIG. 10, the saliency map generator 140 may generate a dynamic saliency map using a biology-based selective attention model.

Specifically, the saliency map generator 140 generates mono saliency maps with respect to extracted images (i.e., images of lip regions) 1010 for a plurality of images input in a unit time. Since the process of generating mono saliency maps has been described with reference to FIG. 8, the duplicate description thereof will be omitted.

The saliency map generator 140 may extract salient points of the plurality of extracted images using the generated mono saliency maps.

Further, the saliency map generator 140 may generate the dynamic saliency map using the generated mono saliency maps and the salient points of the respective mono saliency maps.

FIG. 11 is a diagram explaining the operation of a position determinator of a monitoring device according to a second embodiment of the present disclosure.

Referring to FIG. 5, if a plurality of sound sources (e.g., stereo sound sources or four-channel sound source) are input to the inputter 110, the position determinator 151 may analyze spectrums of the respective sound sources and detect the direction or position in which the sound sources are generated through the analyzed spectrums of the sound sources. Specifically, the position determinator may grasp the generation positions of the sound sources having strength that is equal to or higher than a threshold value using a DUET algorithm. FIG. 5 illustrates the result of detecting upper/lower/left/right sound sources in an angle direction through a four-channel microphone.

Figure 12:
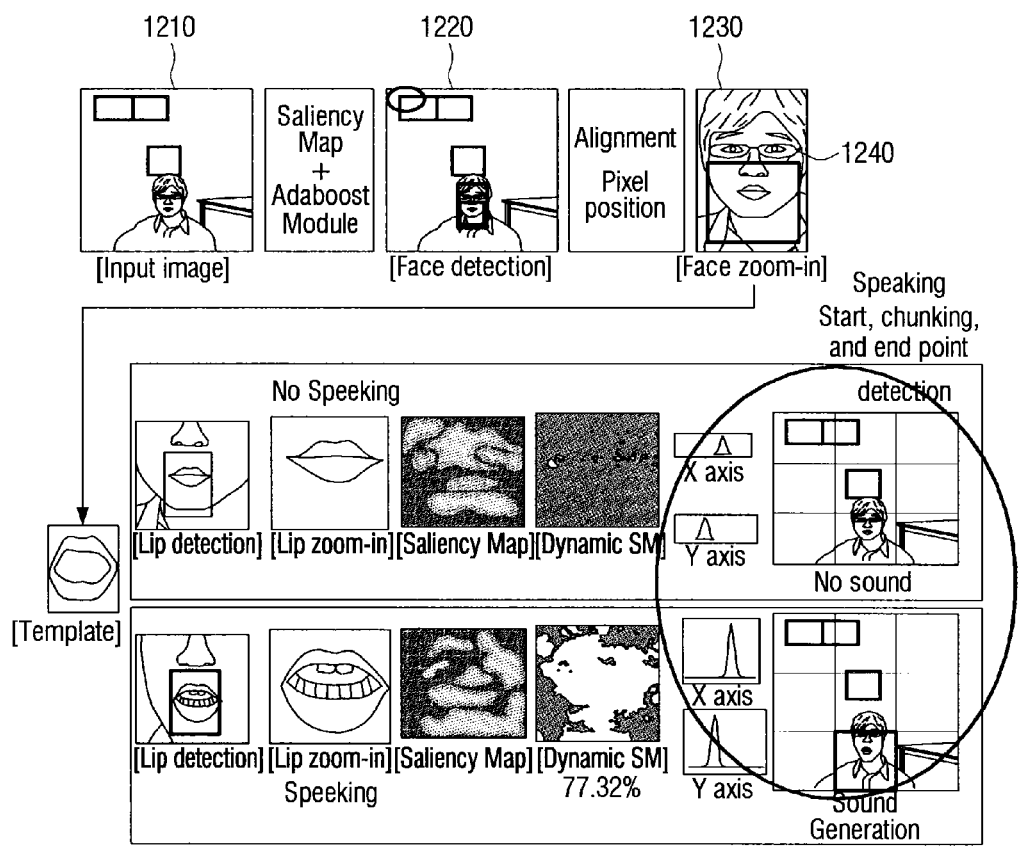
FIG. 12 is a diagram explaining the operation of a monitoring device according to a second embodiment of the present disclosure.

FIG. 12 is a diagram explaining the operation of a monitoring device according to a second embodiment of the present disclosure.

Referring to FIG. 12, a face region 1220 may be first detected with respect to an input image 1210, and then a lip region may be detected with respect to the image 1230 of which the face region is detected. Then, an extracted image 1240 that corresponds to the detected lip region may be generated.

Then, a time point time point when a user speaks, a chunking time point, and a time point when user speaking is ended may be detected on the basis of the shape of the generated extracted image 1240, and the detected time points may be acquired as motion information.

In this case, the monitoring device 100 ma correct the motion information in consideration of the generation positions of the sound sources (or levels of the sound sources) determined by the position detector 151. For example, if the user does not speak but only the lip shape is changed, it is not necessary to perform the voice recognition, but such change of the user's lip shape may not be acquired as the motion information.

According to the monitoring device 100 according to this embodiment, when a speaker's lip moves and an energy value of a sound source that is equal to or higher than a threshold value occurs (i.e., the image motion and the sound source are generated at the same position), it may be determined as a time point when a user is speaking.

Figure 13:
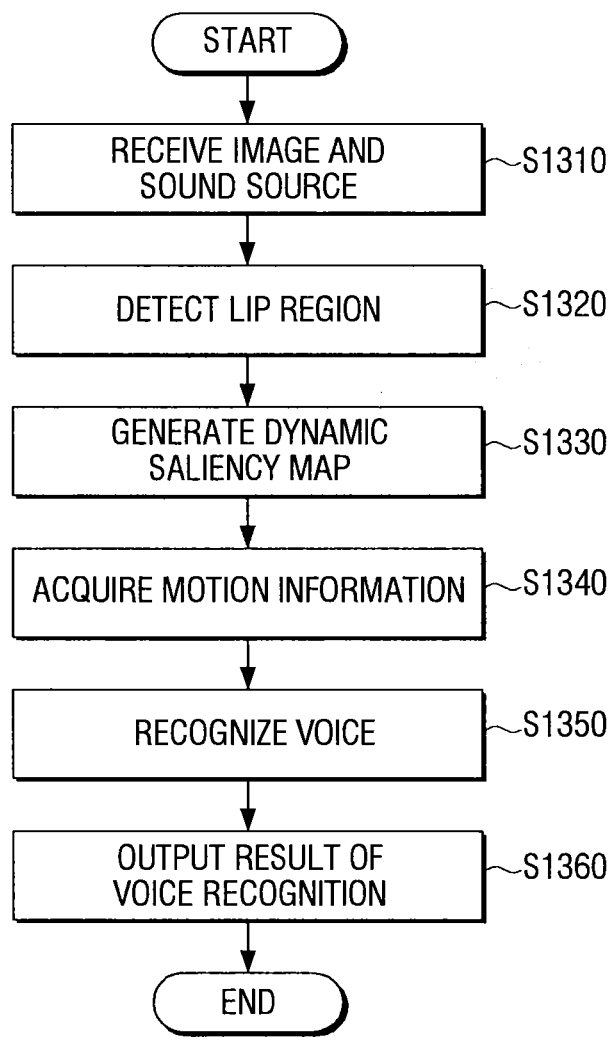
FIG. 13 is a flowchart illustrating a monitoring method according to a second embodiment of the present disclosure.

FIG. 13 is a flowchart illustrating a monitoring method according to a second embodiment of the present disclosure.

Referring to FIG. 13, a plurality of images obtained by capturing a user and a sound source are input (S1310). Specifically, the plurality of images that are captured by an image capturing device, such as an external digital camera or an external camcorder, may be input. Further, the sound source may be input through an external microphone. It is illustrated and described that the images and the sound source are input from an external device. However, in implementation, an image pickup device and/or a voice reading device may directly generate the plurality of images or the sound source.

Then, lip regions of the user are detected from the plurality of images (S1320). Specifically, user face regions may be detected from the plurality of images, and user lip regions may be detected in the detected face regions. In this case, extracted images for the detected lip regions may be generated.

Then, a dynamic saliency map is generated for the detected lip regions of the plurality of images (S1330). Specifically, a plurality of mono saliency maps may be generated using a plurality of extracted images generated as above, and the dynamic saliency map may be generated using the generated mono saliency maps.

Then, lip motion information is acquired using the generated dynamic saliency map (S1340). Specifically, the time point when the user speaks, the chunking time point, and the speaking end time point may be grasped using the generated dynamic saliency map, and the corresponding motion information may be acquired.

Then, voice recognition of the input sound sources is performed on the basis of the acquired motion information (S1350). Specifically, the voice recognition may be performed using only the sound source at the time point when the user actually speaks based on the acquired motion information.

Then, the result of the voice recognition is output (S1360).

According to the monitoring method according to this embodiment, the time point when the speaker speaks, the chunking time point, and the time point when the speaking is ended may be detected using visual information, and the sound source for which the voice recognition is to be performed may be selected. Further, since the visual information and the positions of the sound sources are simultaneously considered, the sound source recognition may be performed with high reliability. The monitoring method as illustrated in FIG. 13 may be executed on the monitoring device having the configuration of FIG. 7 or on a monitoring device having any other configuration.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A monitoring device comprising:
   an input device configured to receive an input of a plurality of images obtained by capturing a user and a sound source;
   a processor programmed to: detect lip regions of the user from each of the plurality of images,
   generate a dynamic saliency map of the detected lip regions of each of the plurality of images, acquire lip motion information using the generated dynamic saliency map, and perform voice recognition of the input sound source based on the acquired motion information; and an outputter configured to output a result of the voice recognition.

2. The monitoring device as claimed in claim 1, wherein the processor is further programmed to:

detect face regions of the user from each of the plurality of images, and detect lip regions of the user in the detected face regions.

3. The monitoring device as claimed in claim 2, wherein the processor is further programmed to detect the face regions of the user using an Adaboost algorithm, and detect the lip regions using pre-stored templates.

4. The monitoring device as claimed in claim 2, wherein the processor is further programmed to extract the detected lip regions from each of the plurality of images and generates a plurality of extracted images.

5. The monitoring device as claimed in claim 4, wherein the processor is further programmed to generate a plurality of mono saliency maps for each of the plurality of extracted images and generates a dynamic saliency map using the plurality of mono saliency maps generated.

6. The monitoring device as claimed in claim 1, wherein the motion information includes at least one piece of time point information of time point information when the user speaks, chunking time point information, and time point information when user speaking is ended.

7. The monitoring device as claimed in claim 1, wherein the processor is further programmed to perform voice recognition only for the sound source input at a time point when the user speaks based on the acquired motion information.

8. The monitoring device as claimed in claim 1, wherein the input device receives a plurality of sound sources heard at separate positions, and the processor is further programmed to determine generation positions of the sound sources through analysis of the plurality of sound sources, and perform the voice recognition of the input sound sources based on the acquired motion information and the determined generation positions of the sound sources.

9. A monitoring method comprising:

receiving an input of a plurality of images obtained by capturing a user and sound sources;

detecting detect lip regions of the user from each of the plurality of images;

generating a dynamic saliency map of the detected lip regions of each of the plurality of images;

acquiring lip motion information using the generated dynamic saliency map;

performing voice recognition of the input sound sources based on the acquired motion information; and outputting a result of the voice recognition.

10. The monitoring method as claimed in claim 9, wherein the detecting comprises:

detecting face regions of the user from the plurality of images; and detecting lip regions of the user in the detected face regions.

11. The monitoring method as claimed in claim 10, wherein the detecting the face regions includes detecting the face regions of the user using an Adaboost algorithm, and the detecting the lip regions includes detecting the lip regions using pre-stored templates.

12. The monitoring method as claimed in claim 10, further comprising extracting the detected lip regions from each of the plurality of images and generating a plurality of extracted images.

13. The monitoring method as claimed in claim 12, wherein the generating the dynamic saliency map comprises generating a plurality of mono saliency maps for each of the plurality of extracted images and generating dynamic saliency map using the plurality of mono saliency maps generated.

14. The monitoring method as claimed in claim 9, wherein the motion information includes at least one piece of time point information of time point information when the user speaks, chunking time point information, and time point information when user speaking is ended.

15. The monitoring method as claimed in claim 9, wherein the performing the voice recognition comprises performing voice recognition only for the sound sources input at a time point when the user speaks based on the acquired motion information.

16. The monitoring method as claimed in claim 9, wherein the receiving the input includes receiving the plurality of sound sources heard at separate positions, the monitoring method further comprising determining generation positions of the sound sources through analysis of the plurality of sound sources, and the performing the voice recognition includes performing the voice recognition of the input sound sources based on the acquired motion information and the determined generation positions of the sound sources.

* * * * *